Jan. 24, 1956  R. E. KRUEGER III  2,731,974
CONSTANT WEIGHT FLOW FLUID FLOW CONTROL VALVE
Filed June 5, 1951  3 Sheets-Sheet 1
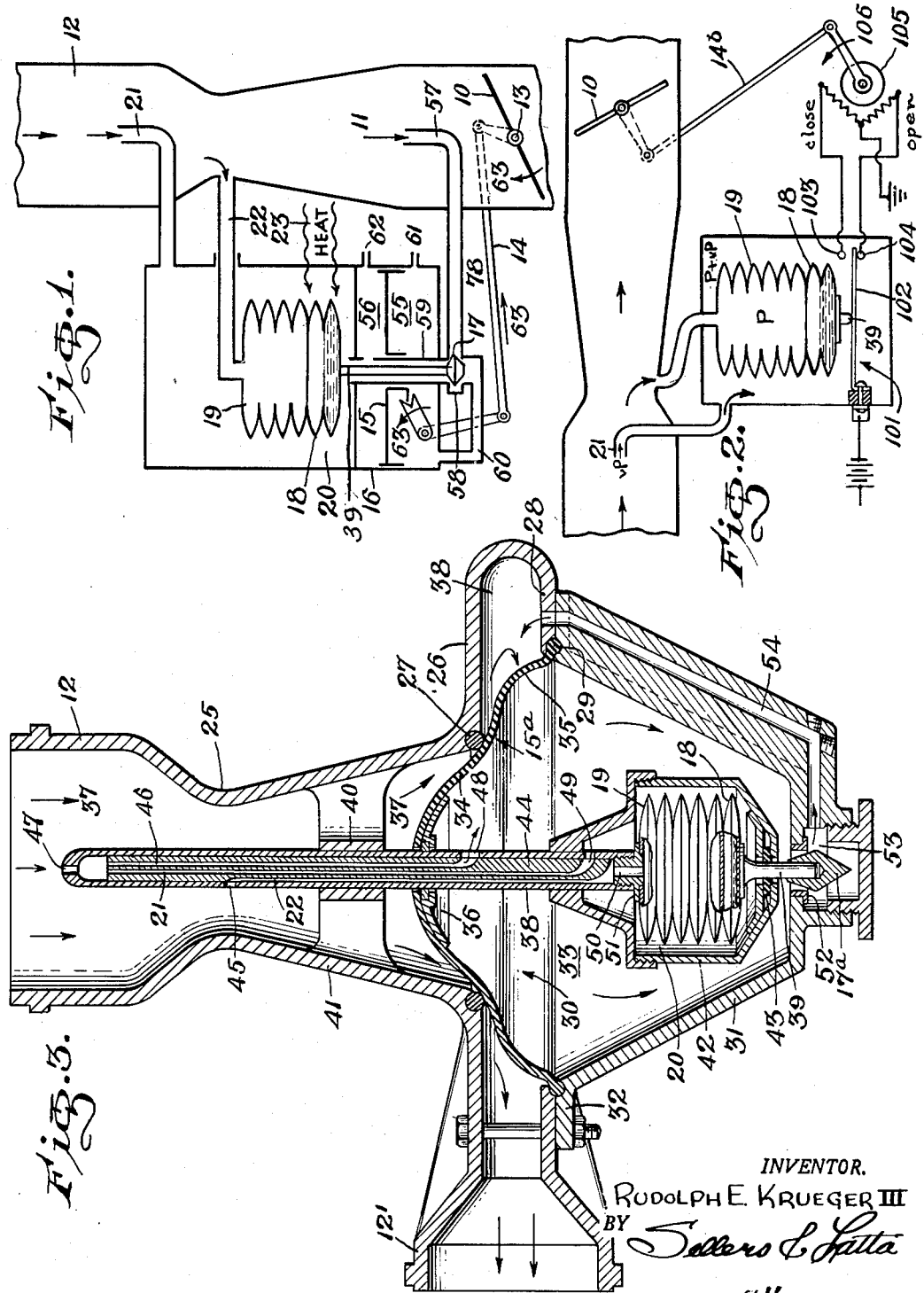
INVENTOR.
RUDOLPH E. KRUEGER III
BY
Attorneys

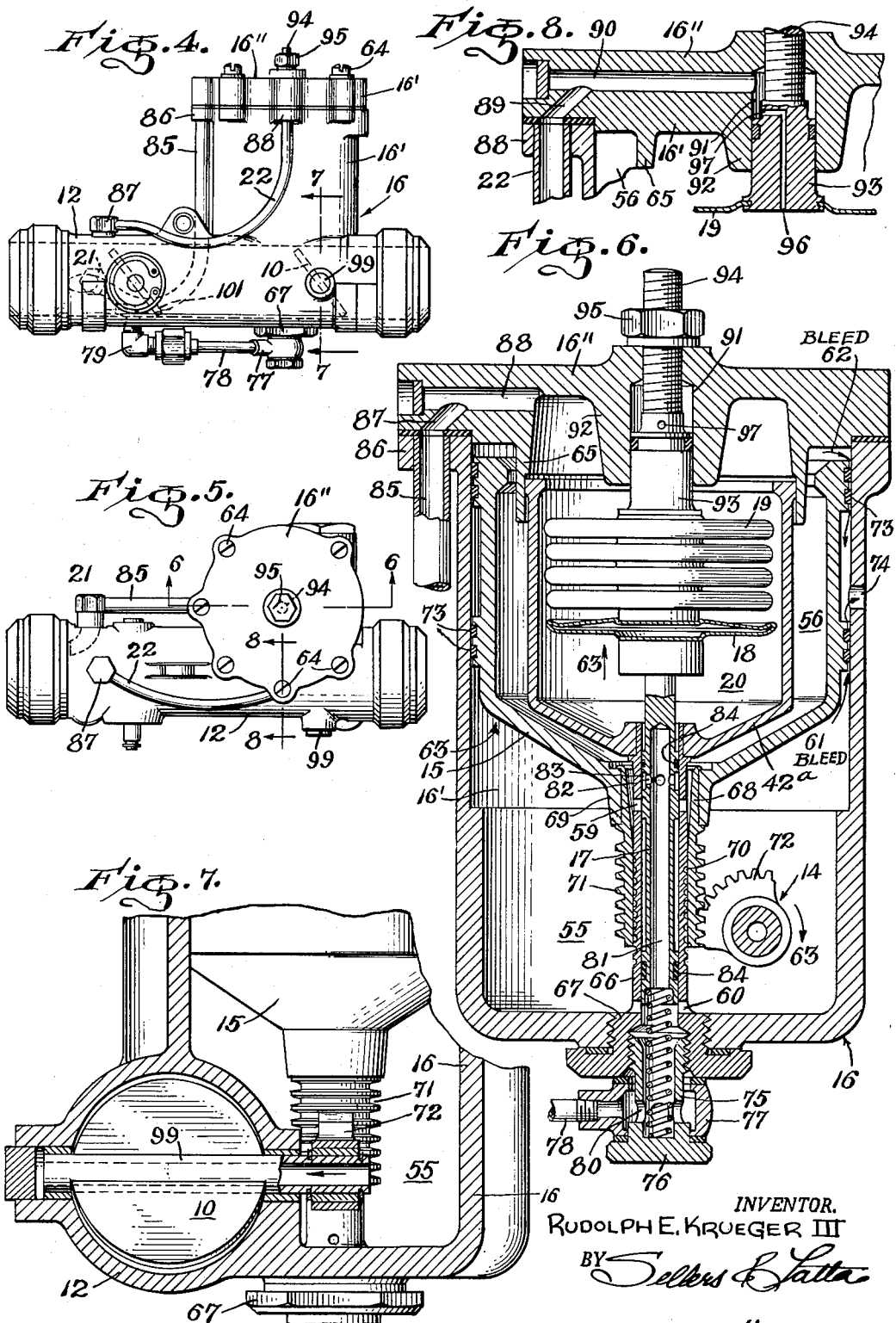

Jan. 24, 1956 R. E. KRUEGER III 2,731,974
CONSTANT WEIGHT FLOW FLUID FLOW CONTROL VALVE
Filed June 5, 1951 3 Sheets-Sheet 3

INVENTOR.
RUDOLPH E. KRUEGER III
BY
Sellers & Latta
—ATTORNEYS—

United States Patent Office 2,731,974
Patented Jan. 24, 1956

2,731,974

CONSTANT WEIGHT FLOW FLUID FLOW CONTROL VALVE

Rudolph Ernest Krueger III, Burbank, Calif.

Application June 5, 1951, Serial No. 230,004

22 Claims. (Cl. 137—80)

This application is in part a continuation of my application for Flow Regulator, etc., Serial No. 573,604, filed January 19, 1945, upon which U. S. Letters Patent No. 2,598,274 were issued May 27, 1952.

This invention relates to weight-flow control of gases, commonly designated mass flow control. The invention has as its general object to provide a valve for controlling the flow of a selected quantity by weight of gaseous fluid per unit of time (hereinafter referred to as "weight flow"); regardless of changes in upstream pressure and temperature. The invention aims to provide a valve adapted to automatically limit weight flow of gas regardless of change in conditions, such as density and velocity, existing in the flowing stream of gas.

A further object is to provide such a flow control valve, incorporating either pneumatic or electric means for responding to measurements of pressure and temperature in order to maintain the desired flow.

While the invention is applicable to any flow control system in which it is desirable to control flow in terms of unit weight per unit time, it is particularly useful in aircraft air conditioning systems in which pressure is controlled in accordance with a preselected schedule, by an outflow valve that responds automatically to changes in cabin pressure and ambient pressures, the air being pumped into the aircraft cabin by one or more superchargers (compressors) the operation of which may vary considerably at different altitudes.

A major cause of flow fluctuation, other than those initiated by the supercharger, is the action of the cabin temperature control valve, which either forces all the air through the refrigeration turbine, at great pressure and flow loss, or bypasses the turbine and allows the air to flow directly to the cabin with little restriction. In order to avoid placing upon the outflow valve the entire burden of handling the flow and pressure variations occurring in the cabin from all causes, and because the pressurizing schedule customarily calls for a substantially uniform ventilation rate (the continued replacement of stale air by fresh air at a preselected number of changes per hour) there is need for control of the incoming air. The most desirable form of controller is one that will maintain a substantially uniform inflow in terms of weight flow per minute. Thus the controller of the present invention is particularly adapted to control inflow into a pressurized aircraft cabin.

Weight-flow may be determined from the following factors: (a) velocity through a duct or orifice of known area; and (b) density in the same duct or orifice. Density may be determined from absolute pressure and absolute temperature in accordance with the following formula:

$$\overline{W} = K \frac{P}{(T)}$$

where $\overline{W}$ represents pounds per cubic foot, P represents pressure in inches of mercury absolute, T represents temperature in degrees Fahrenheit absolute, and K represents a constant (e. g. —1.325 for air). The accurate determination of weight flow from measurements of velocity and density in the same duct area is based upon the assumption that the velocity is uniform across such area. Accordingly, a further object of the invention is to utilize measurements of both density and flow velocity in a selected throat area, in order to control weight flow directly as a function of such throat area. The weight flow controller operating upon this principle can then be a non-dimensional device (insofar as the measuring instruments are concerned) and a further object is therefore to provide a standard measuring unit or "brain" which can be utilized in connection with various servomotor mechanisms for controlling valves of various flow capacities. A specific object of the invention is to provide a flow control valve adapted to maintain a preselected weight-flow of air, automatically, in response to changes in velocity and density of the flowing gas, utilizing three types of measuring instruments, namely (a) absolute pressure sensitive means; (b) temperature sensitive means; and (c) pressure differential sensitive means.

More specifically, the invention provides a weight flow regulating valve utilizing a combination of an impact pressure measuring instrument such as a Pitot tube, and a static pressure measuring instrument, for obtaining (a) a differential pressure reading as a means of determining velocity and (b) an impact (total) pressure reading as one factor in determining density, both measurements being taken in the same throat area. The velocity pressure differential $vP$ is a function of velocity according to the following formula:

$$vP = \frac{QV^2}{2}$$

where $vP$ represents the pressure differential in pounds per square foot between total pressure and static pressure; Q represents air density in slugs per cubic foot; and V represents velocity in feet per second. Slugs (of air) per cubic foot is equal to pounds per cubic foot divided by 32.2 (gravity).

I find that satisfactory results can be obtained by utilizing measurements of temperature and total pressure to determine density and measurements of total pressure and static pressure (to obtain a net measurement of pressure differential which represents velocity pressure) to determine velocity. Thus it becomes possible to utilize a common means (e. g. a Pitot tube and a pressure chamber enclosing both absolute and differential pressure sensitive elements) to register the total pressure measurement (which is common to the measurements for both density and velocity); and a further object of the invention is to provide a relatively simple and compact measuring apparatus employing such a means for registering total pressure, common to both the velocity and the density measuring devices.

The invention further contemplates taking the readings at a point along the flow duct where there is a restriction, or necking down of the duct area, in order to increase the velocity of the stream above that of the normal duct stream velocity. Since the velocity measuring pressure differential is proportional to the square of the velocity, a stronger and more accurate reading can be obtained at the higher velocity. In order to reduce pressure loss to a minimum, the restriction is expanded by means of a diffuser section as in a venturi.

A further object of the invention is to provide apparatus for measuring the total duct pressure against ambient atmospheric pressure as a reference.

It can be shown that with an air density of a given value, a specific throat velocity will be required for a given weight flow, and that an increase or decrease in density will call for a lower or higher velocity respectively, to produce the same rate flow. Accordingly, a further object of the invention is to provide a weight flow controller in which velocity is adjusted to compensate for changes in air density, in order to maintain a preselected uniform weight flow.

A further object is to provide an apparatus such as that outlined above, in which the throat velocity is controlled by means of a valve in the flow duct, since in many cases it is not possible or feasible to control the inlet pressure. I find that in the majority of cases, in aircraft installations, it is preferable to locate the valve downstream from the measuring section, although an upstream position of the valve can be utilized.

A further object is to provide a relatively simple arrangement of temperature and pressure responsive controls in a "brain" which embodies a pilot actuator for controlling (a) the pilot valve of a pneumatic servomotor, or (b) the electric switches of an electric servomotor, a servomotor in either instance being utilized to actuate the throttle valve in the duct wherein flow is to be controlled.

Other objects will become apparent in the ensuing specifications and appended drawings in which:

Fig. 1 is a schematic representation of a portion of a gas conduit system including a pneumatic embodiment of the invention;

Fig. 2 is a schematic representation of a gas conduit system including an electric embodiment of the invention;

Fig. 3 is an axial sectional view of a flow control valve embodying the control "brain" of my invention, a pilot valve actuated thereby, and a pneumatic flow adjusting valve controlled by the pilot valve;

Fig. 4 is a side view of a modified form of flow control valve embodying pneumatic actuation;

Fig. 5 is a plan view of the same;

Fig. 6 is a detail sectional view of the same taken on the line 6—6 of Fig. 5;

Fig. 7 is a detail sectional view thereof taken on the line 7—7 of Fig. 4;

Fig. 8 is a detail sectional view taken on the line 8—8 of Fig. 5;

Figure 9:
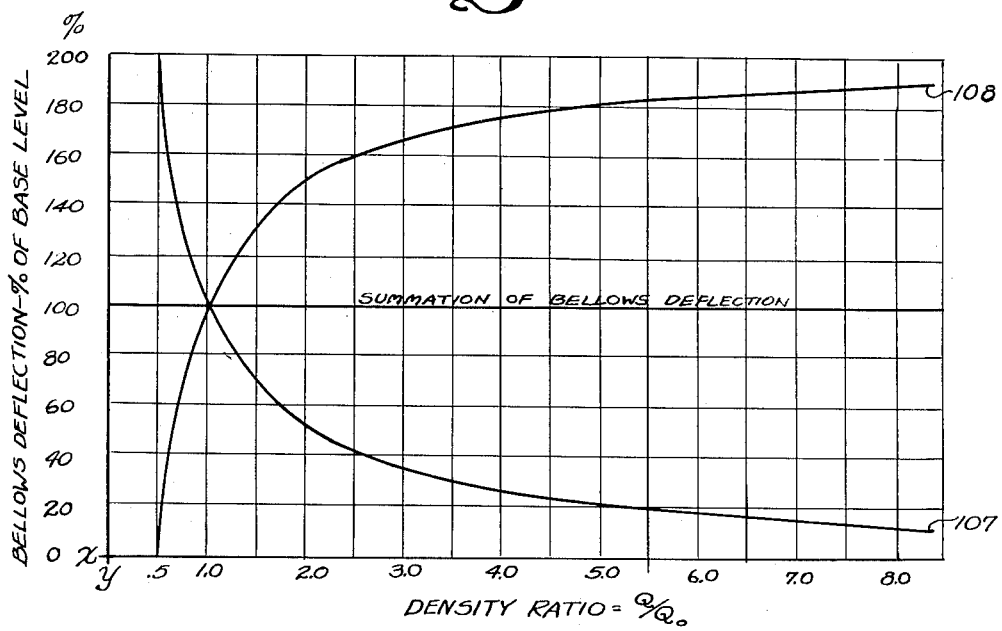
Fig. 9 is a graph illustrating operational characteristics of the valve of the invention.

*General description of invention—Fig. 1 schematic disclosure*

Referring now to the drawings in detail, I have shown schematically in Fig. 1, an embodiment of the invention utilizing pneumatic actuation of a butterfly type throttle valve 10 controlling the flow, in the direction indicated by the arrow 11, of a gas travelling in a duct 12. Valve 10 is mounted on a shaft 13 which, externally of the duct, is connected through suitable linkage, indicated generally at 14, to a pneumatic servomotor piston 15 operating in a casing 16 under the control of a pilot valve 17. Pilot valve 17 responds to the combined action, in series, of a differential pressure responsive bellows 19 which measures changes in velocity of flow in duct 12, and a sealed bellows 18 which compensates for changes in density in the fluid in duct 12, and which may therefore be referred to as a compensating cell. Bellows 18 and 19 are arranged in tandem in a pressure chamber 20, with one end of bellows 19 fixed to the casing 16 to provide the sole support for both bellows, and the opposite end of bellows 18 movable to register, on the pilot valve 17, the aggregate axial dimensional changes of both bellows.

Chamber 20 is pneumatically sealed off from the chambers defined in casing 16 on opposite sides of servomotor piston 15, in order that true pressures, unaffected by changes in pressure in the servomotor chambers, may be registered in chamber 20. The pressure in chamber 20 is the total pressure (velocity pressure plus static pressure) in duct 12, as measured by a Pitot tube 21 extending into duct 12 with its open, receiving end facing upstream, the other end of Pitot tube 21 communicating with chamber 20.

Bellows 19 responds to the differential between the total pressure applied to its exterior within chamber 20 and static pressure in duct 12 which is measured by a tube 22 tapped into the side of duct 12, extending into chamber 20 and communicating with the fixed end of bellows 19. As a differential pressure, it is referred to hereinafter by the notation $dP$. This differential represents the increase of total pressure over static pressure, due to velocity impact, and as such, is referred to herein by the notation $vP$. From the foregoing it will be obvious that $dP = vP$.

Compensating cell 18 is a combined pressure and temperature measuring device. It is partially filled with a suitable gas, preferably the same as the gas to be measured in duct 12, the remaining volume being taken up by an inert fluid which is unresponsive to pressure changes and only slightly responsive to temperature changes. The purpose of this filler is to provide the cell 18 with a full range of deflection, down to a zero volume limit, without bottoming. Being a closed cell, and having only slight spring rate and load, it responds to any change in internal pressure therein caused by a change in temperature, and to any change in external pressure thereon (change in pressure in chamber 20). It responds directly to changes in total pressure in chamber 20, contracting as the pressure increases and expanding as such pressure decreases; and inversely to changes in temperature, expanding in response to temperature increase and contracting in response to temperature decrease. In practice, chamber 20 is related to duct 12 so that heat is conducted from the latter to the chamber by conduction through the metal walls of the apparatus. The transfer of heat is indicated schematically in Fig. 1 by arrows 23.

The arrangement between flow controlling throttle valve 10, servomotor piston 15, pilot valve 17 and bellows 18, 19 is such that: (a) when an increase in velocity tends to increase mass flow above the preselected (rated) value, the resulting increase in pressure differential will contract bellows 19, actuating pilot valve 17 to effect movement of throttle valve 10 in closing direction; (b) when an increase in total pressure or (c) a decrease in temperature causes an increase in density tending to increase weight flow above the rated value, bellows 18 will contract to effect the same result; conversely, when a decrease in velocity tends to decrease mass flow below the rated value, or when an increase in temperature or a decrease in total pressure causes a decrease in density likewise tending to decrease weight flow, bellows 19 or 18, or both, will expand, actuating pilot valve 17 in the direction to cause throttle valve 10 to move in the opening direction. In each instance, the resulting movement of throttle valve 10 is such as to restore weight flow toward the rated value.

Bellows 18 and 19 operate in series in order that both may respond simultaneously to simultaneous changes in velocity and density, and so that their responses may act cumulatively or differentially, as required.

Further reference will be made of Fig. 1 for the purpose of explaining how these functions are executed by the pneumatic servomotor apparatus embodied in the form of the invention shown in Figs. 4–8 inclusive.

Constant weight flow per minute through a fixed throat area may be maintained by maintaining as a constant the product of density and velocity. Expressed mathematically, $QVA = K$, where Q represents density, V represents velocity, A represents throat area and K represents the selected weight flow per minute.

In order that this condition may be maintained, the combined length of bellows 18, 19 must remain constant, and any change in length in either direction from this constant value, indicates an error in flow. In other words, to maintain constant weight flow, the deflection of the differential bellows 19 must be at all times matched by an equal and opposite deflection of the compensating cell 18, resulting in a net zero change in position of the pilot actuating stem 39 on the free end of bellows 18. With this basic condition existing, it becomes possible to utilize motion of the stem to actuatet a pilot switch or valve which in turn will cause the throttle valve of the flow duct to close or open according to demand (deviation from the rated weight flow).

Figures 10, 11:
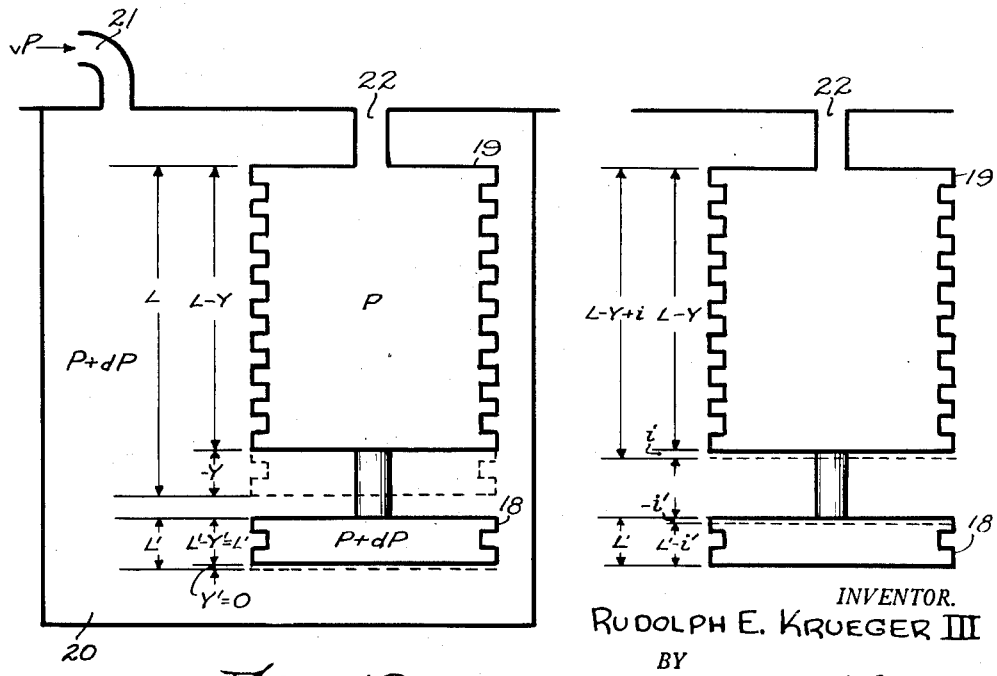
Fig. 10 is a schematic illustration of the pressure responsive "brain" of the apparatus operating at one pressure.
Fig. 11 is a schematic illustration of the same operating at a different pressure.

The relation between volume and deflection of the respective bellows (when the valve is passing the rated weight flow) is indicated in Fig. 10, the values L and L' representing the free lengths of the active portions of the respective bellows, the values Y and Y' indicating respective deflections, and the values $L-Y$ and $L'-Y'$ indicating total active lengths, i. e., total volumes. At this point, it may be noted that the volume of the active (gas-filled) portion of compensating cell 18 is quite small in proportion to that of bellows 19. Actually, this volume proportioning is such that the free-length L' of cell 18 is equal to the deflection Y of bellows 19 with the rated weight flow occurring at base level conditions (e. g. sea-level pressure where valve is assembled). In Fig. 10, normal operating volumes of the respective bellows are indicated by the full lines; free lengths asre indicated by the broken lines; and values Y and Y' are both negative values, representing compression of the respective bellows when fluid is flowing in duct 12, as compared to the un-pressurized condition when no fluid is flowing. At initial base level flow, Y' is zero.

In Fig. 11, a subsequent operating condition (higher pressure) is represented. In this figure, the volumes $L-Y$ and L' correspond to the similarly designated volumes in Fig. 10; the volumes $L-Y+i$ and $L'-i'$ represent volumes existing in response to an increase in pressure in the system; and the increments of deflection of the respective bellows occurring in the transition from the lower to the higher pressure conditions, are represented by $i$ and $i'$ respectively. It will be noted that deflection $i$ is a positive one (expansion); deflection $i'$ is a negative one (contraction); and the net result is that the position of the bottom of cell 18 has remained unchanged. The subsequent condition is denoted by the dotted lines.

Graph Fig. 9 illustrates the relation between the deflection of cell 18, represented by the curve 107, and the deflection of bellows 19, represented by the curve 108. Normal, base level volumes are indicated where the two curves cross, the value 1.0 being selected to indicate such volume in each instance. Deflections are indicated on the Y axis in terms of percentages of such base volumes. Deflections are plotted against density ratio (ratio between density in duct 12 at any given level of operation and density at base level, i. e., $Q/Q_0$ on the X axis. It will be immediately apparent that curves 107 and 108 are symmetrical with respect to the normal ordinate 1.0 representing the summation of deflections at constant weight flow, and that for every percent of decrease in volume of cell 18, as pressure rises, there will be an equal percent of increase in volume of bellows 19.

Compensating cell 18 will deflect in accordance with changes in the volume of gas trapped therein, which changes will occur in response to changes in both pressure and temperature.

From the curve 107 of Fig. 9 it will be noted that the compensating cell 18 will deflect or change length according to the following relationship:

Condition I (sealed at room pressure):
 Volume (of trapped gas)=1.0
 Pressure (absolute)=15 p. s. i.
 Therefore $PV=15$ Condition II (at twice room pressure):
 Volume=.5
 Pressure (absolute)=30
 $PV=30\times.5=15$
Condition III (at four times room pressure):
 Volume=.25
 Pressure (absolute)=60
 $PV=60\times.25=15$ It will be noted from the above figures for the three conditions given, that the equation $PV=15$ holds true in each case.

This equation may be modified to indicate the effect of temperature, by multiplying the value $PV$ by the reciprocal of T (temperature). Hence $$\frac{PV}{T}=K; \frac{P_1V_1}{T_1}=\frac{P_2V_2}{T_2}$$

with the subscripts 1 and 2 indicating respectively the condition at initial sealing of the bellows 18 (e. g. room pressure) and a subsequent condition in the operation of the valve (as in Figs. 10 and 11 respectively).

Fig. 11, and curve 108 of Fig. 9 indicate that as the total pressure in chamber 20 increases, the volume of differential bellows 19 will likewise increase. While at first impression it might appear impossible for this result to occur, it will be understood by considering the following facts: (a) The bellows 19 responds only to the differential $dP$ between total pressure and static pressure and is compressed by this differential whenever the rated flow is passing through duct 12. The extent of the compression is determined by a balance between this differential and the reacting spring load set up in the bellows as the result of the compression; (b) $dP=vP$; (c) the velocity pressure varies with changes in velocity and density in accordance with the formula $vP=\frac{1}{2}QV^2$; (d) density is directly proportional to static pressure and, accordingly, is substantially proportional to the total pressure in chamber 20; (e) accordingly, as the pressure rises, density will increase, and velocity will necessarily decrease in order to avoid an increase in weight-flow. The decrease in velocity results in a decrease in velocity pressure, i. e., in the pressure differential $dP$.

It will now be apparent that at minimum pressure, compression of differential bellows 19 will be at a maximum (while that of compensating cell 18 will be at a minimum) and that with increasing pressure, compression of differential bellows 19 will progressively decrease while that of cell 18 will progressively increase. For example by reference to Fig. 9, assuming as a starting point the base level (ordinate 1.0), at which normal volumes of the respective bellows are both represented by the value 1.0, progressive increase in pressure upwardly of e. g., 15 p. s. i., will be attended by progressive expansion of differential bellows 19, as indicated by curve 108, to successive values of 1.2%, 1.4%, etc., of volume, and by progressive shrinkage of bellows 18, as indicated by curve 107, to .8%, .6% etc., of normal volume 1.0. The growth of bellows 19 is at a rate such as to balance the shrinkage of bellows 18 so long as the rated weight flow is maintained. This result is attained by proportioning the volumes of the two bellows, as stated above, so that the value of L' (free length of bellows 18) is equal to Y (normal deflection of bellows 19 at the base level of operation).

With this relation existing, the ability of the apparatus to control weight flow to a constant value, can be illustrated mathematically, based upon the following given information including said relation:
1. $P$=static pressure of the gas.
2. $T$=temperature of the gas.
3. $Q$=density of the gas; $V$=velocity of the gas.
4. $vP$=velocity pressure of the gas ($=dP$).
5. $L$ and $L'$=free lengths of $dP$ bellows and compensating cell respectively.

6. Compression of bellows is negative deflection; expansion is positive deflection.

7. $-Y$ and $Y'$=initial deflections of $dP$ bellows and compensating cell respectively.

8. $i$=additional deflection of $dP$ bellows.

9. $-i'$=additional deflection of compensating cell.

10. $K$=the selected weight flow.

11. Values of P and T are assumed to be unity ($P=1$; $T=1$) when the valve is operating, at the base level, to pass the selected weight flow (K is at rated value). This assumption is made in order to simplify the equations which follow.

12. $L'=-Y$ (the volume relationship referred to above).

13. Temperature in compensating cell=$T$.

14. Spring rate of compensating cell=0.

15. Pressure in chamber 20 will be assumed to be P instead of $P+dP$ (this assumption introduces an error which is inherent in the apparatus itself, but which is small enough to be ignored; the assumption does simplify the mathematics of this illustration).

16. $dP = \frac{1}{2}QV^2$.

17. $C$=a suitable constant.

Proof:

At the base level, $dP$ bellows deflection is represented by:

18. $Y = -L' = -CQV^2$ (initial compression of bellows 19).

19. $Y' = 0$ (since pressure inside and outside bellows 18 are equalized at the value $P+dP$).

20. Total deflection $= 0 - L' = -L'$ (Equations 18 and 19).

As pressure and temperature vary from the base level:

21. $i = -C\frac{(QP)}{T}\frac{(VT)^2}{(P)^2} = \frac{CQV^2T}{P} = -\frac{L'T}{P}$ From the basic relationship $\frac{P_iV_i}{T_i} = \frac{P_2V_2}{T_2}$.

22. $-i' = \frac{L'T}{P} - L'$ (new length minus original length).

23. $-\frac{L'T}{P} + \frac{L'T}{P} - L' = -L'$ (adding Equations 21 and 22).

Since $-L'$ equals total deflection at the base level, it will now be apparent that the two bellows have maintained a constant overall length irrespective of pressure and temperature changes, so long as the weight flow has remained constant. Therefore, the fixed normal position of pilot valve 17 has resulted in a constant weight flow, with any deviations in the latter being immediately corrected by temporary fluctuations in the overall bellows length.

As an illustration of the accuracy of performance that can be expected, and of how the proper values may be selected for the various elements of the valve structure and "brain" let us assume the following desiderata in a particular case: (a) it is desired to control over a positive density range of 10:1; (b) with control in the negative direction of, e. g. 3:1; and (c) with sea level density as the reference point or point of departure. The density of air at sea level is .076 pound per cubic foot. Accordingly, the density of air at ten times sea level pressure would be .76 pound per cubic foot and the density of air at one third sea level pressure would be .025 pound per cubic foot.

It is further required that (d) the motion requirement for actuating the pilot valve or switch must be .006 inch total or ±.003 inch; and (e) the control accuracy must be equivalent to ±.4 inch water pressure differential across the differential bellows 19. Accordingly, the bellows rate must be .0075 inch per inch of water. The power required will depend upon friction or hysteresis in the pilot mechanism and the bellows effective area must be sufficient to provide said adequate power.

It is further required that (f) the unit shall control within ±10% of a given weight flow per minute. A switch gap of ±.003=±.4 in H₂O determines or matches the ±10% requirement at 10:1 sea level density because at 10 times sea level density Q=4 in. H₂O or $$\frac{40}{10}$$

and with a switch gap of about .4 in. H₂O we satisfy the requirement of ±10% weight flow at the most critical condition. In arriving at the values to be determined, it is decided that a velocity, in the venturi throat, of approximately 410 feet per second at sea level density, will be acceptable because of relatively small compressibility errors (approximately 1.2 inches of water out of 40), and that the pressure loss in the measuring venturi will be small because the pressure recovery possibilities of the venturi diffuser will allow recovery of approximately 80%, giving an overall loss through the wide open valve of approximately 8.10 inches water. Having verified the assumption that the selected design features as well as the initial requirements are all acceptable for the particular job under consideration, the designer proceeds to design the differential bellows 19 to deflect L inches at the pressure differential resulting from a velocity of 410 feet per second at sea level density. This differential is approximately forty inches of water. Therefore L equals 40×.0075 (item (e) above) or .30 inch. This establishes the volume of air sealed into the compensating cell, and therefore the maximum deflection if we assume that we expose the cell to infinite pressure after sealing.

The bellows is then assembled in a housing in a position to actuate the pilot valve or switch. The pilot valve or switch will be positioned to impulse the throttle valve actuator to the wide open position until a pressure differential exists across the differential bellows 19 that is equal to 40 inches of water at sea level density conditions, this differential being equal to approximately 410 feet per second through the venturi throat. As was mentioned earlier, the brain is sensitive to pressures only, therefore a throat area must be established for the desired flow rate. The formula utilized to determine area is that given above, namely $K = QVA$. K having been determined by selection, and Q and V having been determined, area may be determined by solving the equation for A, namely, $$A = \frac{K}{QV}$$

The wide open position of the actuator valve will of course correspond to normal velocity at sea level conditions. Upon an increase in duct pressure, the compensating cell 18 will contract causing the pilot valve to be actuated with a lower differential than 40 inches water. Let us assume that the pressure is doubled and the temperature stays constant. Then the compensating cell will deflect one half or .160 inch and will cause the differential bellows 19 to require only one half of 40 inches water or 20 inches water to cause the pilot valve to assume the neutral or stabilized position.

In actual practice it has been found that pressure sensitive metal bellows provide the most practical form of pressure and temperature sensitive devices, for measuring the conditions normally found in aircraft. Such use of metal bellows presents a problem in the compensating cell because the cell should be able to deflect to zero volume at infinite pressure, without bottoming or damaging the bellows walls. This difficulty is overcome by partially filling the bellows 18 with an incompressible filler 111. While solid material fitted into the bellows may be employed, it is simpler and more satisfactory to utilize inert fluid having a very low vapor pressure at the temperatures encountered in the operation of the apparatus, and having relatively no absorption of the gas that fills the remainder of the bellows. I have found that silicone fluid is satisfactory for the purpose.

It will now be apparent that cell 18, if half filled with the incompressible filler, could, by contracting to half its previous length, (a limit which of course is not reached in actual operation) reduce its gaseous volume to zero.

A mathematical analysis of the operation of the apparatus as illustrated in Fig. 9, comprising specific examples of measurement of velocity, density, etc., at various ambient air densities, follows:

(1) Assume $dP = 40$ inches water at sea level base condition.

(2) Assume compensating cell 18 filled to 1.0 inch deflection and differential bellows 19 deflected 1 inch at 40 inches water.

(3) Symbols: $Q$ = density; $vP$ = velocity pressure; $V$ = velocity at sea level.

(4) Find velocity at sea level ($=V$).
$dP$ (pounds per square foot) $= \frac{1}{2}QV^2$.
1.0 inch water $= Z$ pounds per square foot.

$$\frac{1}{39.901} = \frac{Z}{206.41}.$$
$Z = 207.41/39.901 = 5.2$.
$dP = 40 \cdot (5.2) = 208$ pounds per square foot.

$$208 = \frac{.002378 \, (V^2)}{2}.$$

$$V^2 = \frac{208 \, (2)}{.002378} = \frac{516}{.002378}.$$

$$V = \sqrt{\frac{516}{.002378}} = \sqrt{175,100} = 418 \text{ feet per second at base level.}$$

(5) Flow $K = QVA$ flow and area are constants). Therefore: flow is proportional to $QV$.

(6) At twice sea level density, velosity $= \frac{V}{2} = 209$ feet per second.

(7) At four times sea level density velocity $= \frac{V}{4} = 104.5$ feet per second.

(8) At one half sea level density, velocity $= 2V = 836$ feet per second.

(9) $dP$ at $\frac{V}{2} = \frac{1}{2}QV^2$.

$Q = .002378(2) = .004756$.
$V = 209$ feet per second.

$$dP = \frac{.004756 \, (209)^2}{2} = \frac{103.9 \text{ lb. per square foot}}{5.2}$$

$= 19.99$ inches water or 50% deflection.

(10) $dP$ at $\frac{V}{4} = \frac{QV^2}{2}$.

$Q = .002378(4) = .009512$.
$V = 102$ feet per second.

$$dP = \frac{.009512 \, (104.5)^2}{2} = 52.0 \text{ lb. per square foot}$$

$/5.2 = 10$ in. water.

$\frac{10 \text{ in.}}{40 \text{ in.}} = 25\%$ deflection.

(11) $dP$ at $2V = \frac{1}{2}QV^2$.

$Q = \frac{.002378}{2} = .001189$.

$V = 836$.

$$dP = \frac{.001189}{2}(836)^2 = 415 \text{ lb. per square foot}/5.2.$$

$= 79.8$ inches H₂O or $\frac{79.8}{40} = 199.4\%$.

(12) At 7:1 density ratio $Y'$ is proportional to $\frac{PV}{T}$

Volume $= \frac{1}{7} = 14.28\%$ of sea level volume.

$Q = .002378(7) = .016646$.

(13) $dP$ at 7:1 density ratio $\frac{V}{7} = \frac{418}{7} = 59.7$ ft. per second.

$$dP = \frac{QV^2}{2} = \frac{.016646(59.7)^2}{2}.$$

$\frac{29.62}{5.2} = 5.7$ inches water $= 14.21\%$ of 40 in.

*Diaphragm type valve—Fig. 3*

Fig. 3 illustrates how the invention may be embodied in a flow valve embodying a diaphragm type valve actuating pneumatic servomotor, disclosed in my aforesaid Patent Number 2,598,274. Fig. 3 illustrates how the flow duct 12 may be provided with a venturi section 25 joined to a toroidal valve casing 26 to define a shoulder having an inset valve seat 27 in the form of a circular ring. Where a venturi or other duct section with a restricted throat or orifice is utilized, the static pressure sensing tap 22 is located at the throat (area of smallest cross-section of venturi) or other restricted orifice, or downstream therefrom; while the Pitot or other total pressure sensing connection is located in the near vicinity, preferably upstream, a satisfactory position being at the inlet end of the venturi, as shown. Integral with valve casing member 26 is an outlet 12'. Opposite valve seat 27, casing member 26 has an inwardly extending flange 28 which terminates in a seat 29 of larger diameter than valve seat 27. The beaded rim of a flexible diaphragm 30 is clamped to seat 29 by a cupped casing member 31 which has a flange 32 secured to flange 28. Casing member 31 cooperates with the adjacent side of diaphragm 30 to define a control chamber 33, in which pressure is constantly modulated in order to control diaphragm 30.

Inside control chamber 33 is the "brain" mechanism, enclosed within a bellows casing 42 which assumes the temperature of the atmosphere within control chamber 33 because of being entirely surrounded thereby. The temperature in the control chamber, in turn, is substantially the temperature of the gas flowing through the duct 12, since the walls of the duct are, in part, the walls of the control chamber and vice versa, so that the heat is readily distributed to the entire duct-control chamber housing assembly. Consequently, the "brain" mechanism of this arrangement is inherently responsive to changes in the temperature of the gas flowing in the duct, so as to obtain the desired density reading.

Diaphragm 30 includes a central throttle valve portion 34, lying inwardly of valve seat 27 and an annular outer diaphragm portion 35 lying between seat 27 and the secured rim of the diaphragm. Valve portion 34 may be wholly or partially rigidified by a dished reinforcing disc 36.

Diaphragm 30 responds to: (a) high pressure in duct 12, of the air stream flowing as indicated by arrows 37; (b) low pressure in annular exhaust chamber 38 defined in casing 26, acting against the outer annular portion 35 of the diaphragm on the same side thereof; and (c) an intermediate control pressure in control chamber 33 acting against the entire area of the other side of the diaphragm. With the diaphragm balanced, in a partially open position, between the three pressures above mentioned, any decrease in control chamber pressure will cause the valve to open wider, whereas an increase in control chamber pressure will cause it to move in the closing direction.

Pressure in control chamber 33 is regulated by the "brain" mechanism, including the bellows 19, one end of which is fixed to a tube 38, the compensating bellows 18 mounted on the movable end of bellows 19, and a pilot valve 17 which is connected to the movable end of bellows 18 by a stem 39. Tube 38 is mounted in a spider 40 in the diffuser section 41 of venturi 25. Bellows 18 and 19 are enclosed within a bellows casing 42 which is securely mounted on tube 38. Stem 39 extends through a packing gland 43 in casing member 42. Casing 42 defines the bellows chamber 20.

Within tube 38 is a core 44 having passages 21 and 46 extending longitudinally therein and opening through the end thereof which faces the upstream end of tube 38. The latter has an opening 47 through which impact (Pitot) pressure is applied to passages 21, 46. Passage 46 has an outlet 48 communicating with control chamber 33, and passage 21 has an outlet 49 communicating with bellows chamber 20. Between core member 44 and the inner wall of tube 38 is defined passage 22 which has an inlet tap 45 registering static pressure in venturi 25, and an outlet 50 communicating with the interior of bellows 19, outlet 50 being in the form of a bore in the center of a fitting 51 which joins bellows 19 to tube 38.

Pilot valve 17a cooperates with a valve seat 52 which defines a valve opening extending between control chamber 33 and a pilot valve chamber 53 in the head of casing member 31. A bleed passage 54 extends, in casing 31, from pilot valve chamber 53 to annular discharge chamber 38 of the main valve.

*Operation of the diaphragm type valve*

In the operation of the diaphragm valve of Fig. 3, the flow of fluid through duct 12, acting upon the throttle valve portion 34 of the diaphragm 30 will unseat the same from seat 27, the diaphragm assuming a position in which the high upstream pressure against central valve portion 34, plus the low downstream pressure against the peripheral portion 35 of the diaphragm will be balanced against an intermediate pressure in control chamber 33. This intermediate pressure is maintained as the result of the flow of air at high pressure through Pitot passage 21 into chamber 33 and the escape of air past pilot valve 17 and through bleed passage 54 into low pressure chamber 38. It will now be apparent that the pressure in chamber 33 will vary in accordance with the rate at which air is permitted to escape past pilot valve 17. This rate in turn will depend upon the response of bellows 18, 19 to (a) the differential of Pitot pressure applied exteriorly to bellows 19 through passage 21 and static pressure applied interiorly to bellows 19 through passage 22, said pressure differential, when increasing in response to an increase in velocity, contracting bellows 19 and thereby moving valve 17 in the closing direction, restricting the escape of air past pilot valve 17 and building up the pressure in control chamber 33 to close throttle valve 34 and restrict the flow; (b) expansion and contraction of compensating bellows 18 in response to changes in temperature and total pressure, the latter applied exteriorly to bellows 18 in chamber 20 through passage 21. For example, an increase in density caused either by a reduction in temperature or an increase in pressure in chamber 20, will in either event effect contraction of bellows 18, moving valve 17 in the closing direction and restricting the outflow from chamber 33 so as to cause partial closing of throttle valve 34, thereby reducing flow to compensate for the increase in density.

An important characteristic of the invention is the enclosure of bellows 18 and 19 so as to subject them to an atmosphere that is isolated from control chamber 33. This is important for the reason that it is the pressure in chamber 33 that is to be controlled by the operation of valve 17, and the changes in the pressure in chamber 33 should not be reflected back in directly corresponding changes in chamber 20, since this would cause the operation to become unstable. The pressure in chamber 20 must accurately reflect changes in total pressure in duct 12, independently of the changes in chamber 33.

*Piston operated valve—Figs. 4-8*

Fig. 1 illustrates how piston 15 may be energized by utilizing valve 17 as a two-way valve to control pressures within pneumatic chambers 55 and 56 defined within cylinder 16 on respective sides of piston 15. The pressure difference between total pressure and atmosphere is utilized for moving the piston 15, impact pressure being delivered from a Pitot tube 57 to a valve casing 58 having respective outlet ports 59 and 60 defined by valve seats one of which is closed by movement of the valve in one direction and the other of which is closed by movement of the valve in the other direction. Outlet 59 communicates with chamber 56. Outlet 60 communicates with chamber 55. Passages for restricted bleed of air from chambers 55 and 56 to atmosphere are indicated at 61 and 62 respectively. These bleed passages tend to bleed away from their respective chambers the high pressure injected into chambers 55, 56 under the control of valve 17. Linkage 14 is so arranged that when the weight flow tends to exceed the preselected value, either through an increase in velocity reflected in a contraction of bellows 19, or an increase in density, reflected in contraction of compensating bellows 18, or both, valve 17 will be moved in the direction to admit more pressure to chamber 55, moving piston 15 upwardly and moving throttle valve 10 in the closing direction all as indicated by arrows 63; whereas, upon a decrease in velocity or density, or both, resulting in expansion of bellows 19 or 18 or both, valve 17 will be moved in the direction to admit more pressure to chamber 56, moving piston 15 downwardly so as to move throttle valve 10 in the opening direction.

Referring now to Figs. 4–8, mechanism shown schematically in Fig. 1 may be embodied in a valve in which casing 16 comprises a deep cup shaped section 16' and a cap section 16" secured to the rim of section 16', as by cap screws 64. Piston 15 is cupped so as to have sufficient axial dimension for deriving adequate support from the cylindrical inner wall of casing section 16', without unduly increasing the axial dimension of the unit, the space inside piston 15 being occupied by casing 42a which is sealed to cap section 16" to define the bellows chamber 20. Casing 42a is supported by a press fit in a flange 65 on the underside of cap 16". Secured in its lower end is the upper end of a sleeve 66, which constitutes an upward extension of a nut 67 threaded into a central opening in the bottom of casing section 16'. Outlets 60 and 59 may comprise a series of radial ports in sleeve 66, near the bottom of casing section 16' and near the upper end of the sleeve 66 respectively, ports 60 opening directly into chamber 55 and ports 59 opening into an annular space defined within an elongated collar member 68 the upper end of which is secured in the hub member 69 of piston 15, formed in the bottom thereof. This annular space communicates, through the open upper end of collar member 68, with chamber 56 inside of piston 15. The lower portion of collar member 68 has a cylindrical internal bearing wall of slightly reduced diameter, bearing upon the outer wall of sleeve 66 and sealed thereto by a packing gland 70. This lower portion of collar 68 also has rack teeth 71 meshing with a gear segment 72 and forming therewith a part of the connecting linkage 14.

The upper portion of piston 15 comprises a cylindrical skirt which has spaced sets of piston rings 73 bearing lightly against the cylindrical inner wall of casing section 16' for relatively free sliding movement of piston 15 in the cylinder, while maintaining a pneumatic seal therein. The space between the sets of rings 73 is preferably vented to atmosphere through one or more ports 74 in casing section 16'. Bleed passages 61 and 62 are defined between rings 73 and the cylinder wall of casing 16, either by a loose fit of the rings in the casing, or by axially extending striations in the cylindrical outer walls of the rings.

Into an enlarged threaded portion of the lower end of the bore within sleeve 66, is threaded the hollow stem 75 of a cap screw 76 which functions to secure and to seal to the bottom of nut 67, an elbow 77 which is connected by means of a tube 78 to a Pitot element 79, the latter including a scoop portion extending into duct 12 as indicated by broken lines in Fig. 4. Radial ports 80 in stem 75 establish communication between elbow 77 and sleeve 66.

Valve 17 is in the form of a tubular stem secured to and projecting downwardly from the bottom of bellows 18 and having an axial bore 81, open at the lower end of the stem to communicate with sleeve 66. Radial ports 82 and an annular external port 83 in the upper portion of the valve 17 are adapted to establish communication between passage 81 and radial ports 59 in sleeve 66, for flow of fluid under pressure from tube 78 to chamber 56.

Valve 17 is slidably mounted in sleeve 66, with suitable annular packing rings 84 to seal the valve in the sleeve. The lower end of the valve is adapted to traverse ports 60 to close those ports. The said lower end, the ports 60, and the ports 59 and 83 are so related to each other that, in the downward movement of the valve, it will open ports 59 at the point where ports 60 are being closed. At the transition point between the closing and the opening of the respective ports, there may be an extremely narrow zone in which both ports are "cracked" open a very slight amount.

Total duct pressure is applied to chamber 20 from Pitot fitting 21, having a scoop extending into duct 12 as indicated in broken lines of Fig. 4, by a tube 85 connected to fitting 21 at one end and at its other end fixed in a boss 86 in casing section 16', and communicating through a port 87 in cap member 16'' with a bore 88 which extends radially inwardly and communicates with the annular upper portion of chamber 20 defined within flange 65.

Static pressure is communicated to the interior of bellows 19 through tube 22 which is connected to duct 12 through an elbow fitting 87 and at its other end is secured in a boss 88 in casing section 16' (Fig. 8) with its upper end communicating through a port 89 and a radial bore 90 extending radially inwardly, with a counterbore 91 in a boss 92 extending downwardly from the center of cap 16''. Bellows 19 is mounted in boss 92 by means of a stem 93 secured to its upper end, stem 93 having a reduced, threaded portion 94 threaded into boss 92 and secured by a lock nut 95. Loosening of nut 95 permits adjustment of bellows and valve assembly 19, 18, 17 by engaging the exposed outer end of stem portion 94 and rotating the entire assembly to a selected position, then re-tightening nut 95 to set it in that position. Stem 93 has a central bore 96 which communicates through a radial port 97 with counterbore 91.

Connecting linkage 14 includes, in addition to rack 71 and gear segment 72, shaft 99 of valve 10 (Fig. 7), which extends from duct 12 through the inner wall portion thereof dividing the duct from chamber 55, and having an end portion projecting into chamber 55, upon which end portion the segment 72 is secured. At this point, it may be noted that duct 12 is formed integrally with casing section 16' at one side thereof, its longitudinal axis disposed at right angles to the axis of casing section 16' and offset laterally therefrom so that the inner wall of duct 12 lies just short of the casing axis.

A butterfly valve 101, shown in Fig. 4, is disposed adjacent the Pitot and static connections 21, 87, and 79 to provide a restricted orifice with a flowmeter function, analagous to the venturi throat indicated in Fig. 1. Valve 101 is adjustable (e. g. manually) to reset the weight flow rate to a selected value by changing the effective area of such flowmeter orifice.

It will now be apparent that, in the operation of the valve of Figs. 4–8, the increase of weight flow beyond the preselected value, of velocity increase or density increase, reflected in contraction of the bellows unit and upward movement of valve 17, may be utilized to close off port 59 and open port 60, allowing the pressure in chamber 56 to bleed through passage 62 and port 74, while the higher pressure from line 78 passes through port 60 into chamber 55, causing piston 15 to move upwardly, rotating gear segment 72 as indicated by arrows 63, and causing valve 10 to close.

*Valve with electric servomotor operation—Fig. 2*

Fig. 2 illustrates schematically how the "brain" mechanism heretofore described may be utilized to operate a two way relay 101 instead of the valve 17. The relay 101 may comprise a movable contact 102, spring urged in one direction for engagement with a contact 103 and moved by stem 39 of bellows 18 in the other direction for engagement with a contact 104. Contacts 103, 104 may control the respective forward and reverse circuits of a reversible motor 105 suitably geared to linkage 14b for actuating throttle valve 10. Relay 101 has a neutral position in which it is opened, so that motor 105 is normally deenergized. The parts are so correlated that upon an increase in the weight flow rate above the preselected value, expansion of bellows unit 18, 19 will close contact 104 for operating motor 105 in the direction to close throttle valve 10 as indicated by arrow 106, while a decrease below the preselected rate will result in opening the throttle valve.

While it is possible to utilize a reversed arrangement of total and static pressures, i. e., one in which total pressure is applied to the inside of $dP$ bellows 19 and static pressure is applied externally to both bellows, such an arrangement would require a different bellows arrangement (i. e. other than the series arrangement disclosed herein). The series arrangement, with total pressure acting exteriorly and static pressure acting internally of the $dP$ bellows, is preferred.

I claim:

1. In a mechanism for controlling fluid flow to a selected weight flow rate, comprising: a flow duct; a throttle valve therein; a servomotor for actuating said valve to vary the flow through said duct; control means comprising a housing defining a pressure chamber, means in said duct for registering the total pressure including static pressure and velocity pressure of the fluid flowing in said duct and for transmitting said total pressure to said pressure chamber, a pair of pressure sensitive elements in said pressure chamber, both subjected externally to said total pressure therein, means for registering said static pressure and transmitting it to the interior of one of said elements to cause the same to respond to changes in velocity pressure as the differential between said total and static pressures, the other of said elements being a closed cell responding directly to changes in said total pressure, said elements being arranged in series in an assembly one end of which is mounted to said housing and the other end of which is free to register changes in the length of said assembly as the cumulative deflections of both said elements; and means for utilizing movements of said free end of the assembly to control the action of said servomotor to operate said throttle valve so as to maintain the rated weight flow.

2. Mechanism for controlling fluid flow to a selected weight flow rate, comprising: a flow duct; a throttle valve therein; a servomotor for actuating said valve to vary the flow through said duct; control means comprising a housing defining a pressure chamber, a pair of pressure sensitive elements in said chamber, arranged in series in an assembly one end of which is mounted to said housing and the other end of which is free to register the changes in the length of said assembly as the cumulative deflections of both said elements, one of said elements being a density responsive closed cell and the other being responsive to the differential between the pressures acting externally and internally thereon, a pair of connections to said duct, one of which is a pitot for registering the total pressure in said duct including static pressure and velocity pressure, and the other of which is a static pressure registering tap, one of said connections communicating with said pressure chamber and the other communicating with the interior of said differential pressure responsive element, whereby the latter will register the differential between said static and total pressures, as the velocity pressure in said duct while said closed cell will register pressure in said duct as a factor of density measurement; and means for utilizing movements of said free end of the assembly to control the action of said servomotor to operate said throttle valve so as to maintain the rated weight flow.

3. In a mechanism for controlling fluid flow to a selected weight flow rate, comprising: a duct having an inlet portion including a venturi throat and an outlet portion including an outlet and an annular intermediate casing section defining an annular outlet chamber communicating with said outlet and substantially concentric with said inlet portion, said annular casing section having an annular valve seat at the junction between said inlet portion and the radially inner margin of said outlet chamber on one side of the latter, and having, on the axially opposite side of said outlet chamber, a mounting seat, of larger diameter than said valve seat, a control chamber casing section attached to said annular casing section, a servomotor comprising a diaphragm the periphery of which is secured between said mounting seat and the rim of said control chamber casing section, the latter cooperating with one side of said diaphragm to define a control chamber in which pressure changes act against the entire area of said one side of the diaphragm, said diaphragm having a central portion, defined inwardly of said valve seat, which on the other side thereof is subjected to upstream pressure in said inlet portion, said central portion constituting a throttle valve for regulating the flow through said duct, said diaphragm having an annular outer portion which on said other side, is exposed to the downstream pressure in said outlet chamber, said diaphragm being normally maintained in a floating, partially open position by a balance between the relatively high and low upstream and downstream pressures acting on said central valve portion and annular outer portion of said one side thereof, and an intermediate control chamber pressure acting on said other side thereof; and control means comprising a housing enclosed within said control chamber and defining a bellows chamber which is pneumatically isolated from said control chamber, a pair of bellows within said bellows chamber, said bellows being attached together in series in an assembly comprising respectively a differential pressure responsive bellows mounted to said bellows chamber housing and a closed cell externally subjected to the pressure in said housing so as to respond to changes therein, said cell having an end free to register changes in the length of said assembly as the net result of deflections in both said bellows, a stem extending from said bellows chamber through the center of said diaphragm and into said venturi throat, said stem having a Pitot mouth facing upstream and receiving the total pressure including the sum of static and velocity pressures, of the fluid flowing in said inlet portion of the duct, a passage extending from said Pitot mouth into said bellows chamber for bleeding fluid thereinto so as to subject each of said bellows, externally to said total pressure, a tap in the side of said stem for registering the static pressure in said inlet portion of the duct, and a second passage, extending from said tap to the interior of said differential pressure responsive bellows to subject said interior to said static pressure and cause the same to register changes in velocity pressure as the differential between said total and static pressures while said closed cell registers directly the changes in said total pressure in the bellows chamber; said stem having a third passage extending from said Pitot mouth into said control chamber to bleed thereinto, the relatively high pressure from said inlet portion of the duct; and means for utilizing the movements of said free end of said closed cell for controlling the operation of said diaphragm, comprising a passage for the outflow of fluid from said control chamber to said outlet chamber and a pilot valve actuated by said free end of the closed cell for controlling the flow through said outflow passage.

4. Flow control mechanism as defined in claim 3, wherein said stem and bellows housing are adapted to transmit to said closed cell the temperature of the fluid flowing through said duct, whereby deflections of said closed cell will constitute a measurement of changes in the density of said fluid.

5. Mechanism for controlling fluid flow to a selected weight flow rate, comprising: a flow duct; a casing having a direct heat conductive connection therewith; a servomotor including said casing and a pneumatic pressure responsive element cooperating with said casing to define a control chamber; a throttle valve in said duct, actuated by movements of said pressure responsive element to regulate the flow therethrough; control means comprising a bellows housing and a pair of bellows therein including a differential pressure bellows responsive to the differential between static pressure and total impact pressure of the fluid flowing in said duct, as a measure of the velocity of said fluid, one end of said differential pressure bellows being mounted on said housing, and a closed compensating cell mounted at one end on the other end of said differential pressure bellows and having its other end free for movement to register the cumulative deflections of both bellows; means defining a bleed passage for flow of relatively high pressure fluid from said duct at the upstream side of said throttle valve into said control chamber; means defining a second bleed passage for outflow of fluid from said control chamber to said duct at the downstream side of said throttle valve; and a pilot valve actuated by movements of said free end of the compensating cell, for controlling said outflow so as to modulate the pressures in said control chamber to maintain the rated weight flow in said duct, said bellows housing being related to said casing to receive therefrom and adapted to transmit to said closed cell, substantially the temperature of said fluid, whereby the response of said closed cell represents a measurement of changes in density in said fluid.

6. Mechanism as defined in claim 5, wherein said casing embodies a cylinder having respective closed ends, said pneumatic pressure responsive servomotor element comprises a cup-shaped piston axially slidable in said cylinder and cooperating with one of said closed ends to define said control chamber, and said bellows housing is accommodated in the space defined within said piston.

7. Mechanism for controlling fluid flow to a selected weight flow rate, comprising: a flow duct; a throttle valve therein; a servomotor for actuating said valve to vary the flow through said duct; control means comprising a housing defining a pressure chamber, means in said duct for registering the total pressure including static pressure plus velocity pressure of the fluid flowing in said duct and for transmitting said total pressure into said pressure chamber, a pair of pressure sensitive elements in said pressure chamber, both subjected externally to said total pressure therein, one of said elements being a differential pressure bellows, means for registering said static pressure and transmitting it to the interior of said differential pressure bellows to cause the same to respond to changes in velocity pressure as the differential between said total and static pressures, whereby to register changes in velocity in the flow in said duct, the other of said elements being a closed cell responding directly to changes in said total pressure and the temperature of said duct, whereby to register changes in density in said fluid, said elements being arranged in series in an assembly one end of which is mounted to said housing and the other end of which is free to register changes in the length of said assembly as the cumulative deflections of both said elements; and means for utilizing movements of said free end of the assembly to control the action of said servomotor to operate said throttle valve so as to maintain the rated weight flow, said servomotor comprising an annular casing member formed in said duct and defining a valve seat encircling said duct and an annular outlet chamber disposed radially outwardly of said seat, a diaphragm peripherally attached to said casing member, and casing means cooperating with said casing member at the periphery of said diaphragm and with said diaphragm, to define a control chamber, said diaphragm being adapted to engage said seat intermediate its center and periphery, to close said duct, and having a central portion constituting said throttle valve and exposed on one side to upstream pressure in said duct and an annular outer portion exposed on said one side to downstream pressure in said duct, the other side of said diaphragm, over its entire area, being exposed to an intermediate control pressure in said control chamber, balancing the aggregate of said upstream and downstream pressures acting on said one side of the diaphragm; said means for utilizing the movements of said free end of the pressure sensitive element assembly comprising a pilot valve, a passage providing a bleed from said duct on the upstream side of said throttle valve into said control chamber, and a second passage, controlled by said pilot valve, providing for discharge from said control chamber to said outlet chamber, whereby to modulate the pressure in said control chamber to actuate said servomotor diaphragm and throttle valve in response to fluctuations in weight flow, to restore the same to its rated value.

8. Mechanism for controlling fluid flow to a selected weight flow rate, comprising: a flow duct; a throttle valve therein; a servomotor for actuating said valve to vary the flow through said duct; control means comprising a housing defining a pressure chamber, means in said duct for registering the total pressure including static pressure plus velocity pressure of the fluid flowing in said duct and for transmitting said total pressure into said pressure chamber, a pair of pressure sensitive elements in said pressure chamber, both subjected externally to said total pressure therein, one of said elements being a differential pressure bellows, means for registering said static pressure and transmitting it to the interior of said differential pressure bellows to cause the same to respond to changes in velocity pressure as the differential between said total and static pressures, whereby to register changes in velocity in the flow in said duct, the other of said elements being a closed cell responding directly to changes in said total pressure and the temperature of said duct, whereby to register changes in density in said fluid, said elements being arranged in series in an assembly one end of which is mounted to said housing and the other end of which is free to register changes in the length of said assembly as the cumulative deflections of both said elements; and means for utilizing movements of said free end of the assembly to control the action of said servomotor to operate said throttle valve so as to maintain the rated weight flow, said servomotor comprising a reversible electric motor and said means for controlling the action of said servomotor comprising a two way switch actuated by movements of said free end of said pressure sensitive element assembly.

9. Mechanism for controlling fluid flow to a selected weight flow rate, comprising: a flow duct; a throttle valve therein; a servo-motor for actuating said valve to vary the flow through said duct; control means comprising a connection to said duct for registering the total pressure including static pressure plus velocity pressure of the fluid flowing in said duct; a connection to said duct for registering the static pressure of said fluid therein; differential pressure sensitive means exposed on its respective sides to said total pressure and static pressure so as to register changes in the differential therebetween, as a measure of said velocity pressure, whereby to register changes in velocity in said flowing fluid; density sensitive means responsive to changes in total pressure and temperature in said duct, whereby to register changes in density in said fluid; and means responding to the cumulative deflections of said differential and density sensitive means to obtain a movement which is operative to control said servomotor, said differential and density sensitive means being arranged to have substantially equal and opposite deflections in response respectively to variations in velocity (as represented by differential pressure changes) and in density, in compensating amounts such that said deflections substantially cancel one another so long as the weight flow rate remains constant, the free length of said density sensitive means being so related to that of said differential pressure sensitive means as to be substantially equivalent to the compression of said differential pressure sensitive means under the velocity pressure existing at a base level of operation.

10. Mechanism for controlling fluid flow to a selected weight flow rate, comprising: a flow duct; a throttle valve therein; a servomotor for actuating said valve to vary the flow through said duct; control means comprising a housing defining a pressure chamber; means in said duct for registering the total pressure including static pressure plus velocity pressure of the fluid flowing in said duct and for transmitting said total pressure to said pressure chamber; a pair of pressure sensitive elements in said pressure chamber, both subjected externally to said total pressure therein, one of said elements being a differential pressure bellows; means for registering said static pressure and transmitting it to the interior of said differential pressure bellows to cause the same to respond to changes in velocity pressure as the differential between said total and static pressures, whereby to register changes in velocity in the flow in said duct, the other of said elements being a closed cell responding directly to changes in said total pressure and the temperature in said duct, whereby to register changes in density in said fluid, said elements being arranged in series in an assembly one end of which is mounted to said housing and the other end of which is free to register changes in the length of said assembly as the cumulative deflections of both said elements; and means for utilizing movements of said free end of the assembly to control the action of said servomotor to operate said throttle valve so as to maintain the rated weight flow, said closed cell having an inert, non-gaseous material filling a portion of its internal space and a gas filling the remainder of said space and having a volume which varies with changes in the compression to which said closed cell is subjected, the free length of the gas filled volume of said closed cell being substantially equal to the deflection of said differential pressure bellows under the velocity pressure existing at a base rate of operation, said differential pressure bellows and closed cell being arranged to have substantially equal and opposite deflections in response respectively to variations in velocity (as represented by differential pressure changes) and in density, in compensating amounts such that said deflections substantially cancel one another so long as the weight flow rate remains constant.

11. Mechanism for controlling fluid flow to a selected weight flow rate, comprising: a flow duct; a throttle valve therein; a servomotor for actuating said valve to vary the flow through said duct; control means comprising a first connection to said duct for registering the total pressure including static pressure plus velocity pressure of the fluid flowing in said duct; a second connection to said duct for registering the static pressure of said fluid therein; differential pressure sensitive means having one side subjected to said total pressure through said first connection and its other side subjected to said static pressure through said second connection, whereby to register changes in the differential between said total and static pressures, as a measure of said velocity pressure, so as to register changes in velocity in said flowing fluid; density sensitive means subjected to said total pressure through said first connection and exposed to the temperature of said duct so as to respond to changes in total pressure and temperature in said duct in a manner to register changes in density in said fluid; and means responding to the cumulative deflections of said differential and density sensitive means to obtain a movement which is operative to control said servomotor, said differential and density sensitive means being arranged to have substantially equal and opposite deflections in response respectively to variations in velocity (as represented by differential pressure changes) and in density, in compensating amounts such that said deflections substantially cancel one another so long as the weight flow rate remains constant, so as to maintain a substantially constant weight flow through a range of density changes in said fluid.

12. Mechanism for controlling fluid flow to a selected weight flow rate in a flow duct comprising: a throttle valve to vary the flow through said duct; a servomotor for actuating said valve; control means comprising a first connection to said duct for registering the total pressure including static pressure plus velocity pressure of the fluid flowing in said duct; a second connection to said duct for registering the static pressure of said fluid therein; differential pressure sensitive means exposed on its respective sides, through the respective connections, to said total pressure and static pressure so as to register changes in the differential therebetween, as a measure of said velocity pressure, whereby to register changes in velocity in said flowing fluid; a housing; density sensitive means therein; said housing having a heat-conductive connection to said duct such as to register the temperature of the duct, the interior of said housing being subjected to said total pressure through said first connection, whereby the pressure and temperature in said housing will be substantially said total pressure and duct temperature at all times, and thus said density sensitive means is responsive to changes in total pressure and temperature in said duct, so as to register changes in density in said fluid; and means responding to the cumulative deflections of said differential and density sensitive means to obtain a movement which is operative to control said servomotor, said differential and density sensitive means being arranged to have substantially equal and opposite deflections in response respectively to variations in velocity (as represented by differential pressure changes) and in density, in compensating amounts such that said deflections substantially cancel one another so long as the weight flow rate remains constant, so as to maintain a substantially constant weight flow through a range of density changes in said fluid.

13. Mechanism for controlling a fluid flow to a selected weight flow rate, comprising: a duct having a restricted orifice through which the fluid flows; a throttle valve arranged to regulate the flow through said duct; a servomotor for actuating said valve to vary said flow; first and second fluid pressure sensing connections both communicating with a region of restricted flow length within said duct adjacent said orifice, said first connection being upstream of said orifice and arranged to register the total pressure including static pressure plus velocity pressure of the fluid flowing through said duct, and said second connection being downstream of said orifice and arranged to register the static pressure of said flowing fluid; differential pressure sensitive means having one side subjected to said total pressure through said first connection and its other side subjected to said static pressure through said second connection, whereby to register changes in the differential between said total and static pressures, as a measure of said velocity pressure, so as to register changes in velocity in said flowing fluid; density sensitive means exposed to said total pressure through said first connection and exposed to the temperature in said duct so as to respond to changes in total pressure and temperature in said duct in a manner to register changes in density in said fluid; and means responding to the cumulative deflections of said differential and density sensitive means to obtain a movement which is operative to control said servomotor, said differential and density sensitive means being arranged to have substantially equal and opposite deflections tending to compensate one another so as to maintain a substantially constant weight flow through a range of density changes in said fluid.

14. For controlling to a selected weight flow, the flow of a gas in a flow regulating system comprising a flow duct, a throttle valve therein, a servomotor for actuating said valve to vary the flow through said duct, a first means for registering the total pressure in said duct, including static pressure and velocity pressure, and a second means for registering said static pressure alone, a controller comprising: a housing defining a pressure chamber; means for transmitting to said housing the temperature of said duct; a pair of pressure responsive elements in series in said chamber, consisting in a differential pressure responsive bellows having one end mounted to said housing and a closed cell having one end attached to the other end of said bellows and having its other end free to register the cumulative deflections of both said elements, said closed cell having an inert liquid filling a portion of its internal space and having a sample of said gas filling the remainder of said space, and having a spring load of slight value so that its deflection will be determined accurately by the expansion and contraction of said gas sample; a connection from said first means to said housing for transmitting said total pressure into said pressure chamber; a connection from said second means to the housing-mounted end of said bellows for transmitting said static pressure into said bellows, whereby said bellows will respond to changes in the differential between said static and total pressures so as to register changes in velocity in said flowing fluid, whereas said closed cell will respond to changes in said total pressure and in the temperature of said housing so as to register changes in density in said fluid; the free length of the gas filled volume of said closed cell being substantially equal to the deflection of said differential pressure bellows under the velocity pressure existing at a base rate of operation; and means responding to the cumulative deflections of said differential and density sensitive elements to obtain a movement which is operative to control said servo-motor, said differential and density sensitive elements being arranged to have substantially equal and opposite deflections compensating one another so as to maintain a substantially constant weight flow through a range of density changes in said fluid.

15. Mechanism for controlling fluid flow to a selected weight flow rate, comprising; a venturi through which the fluid flows, said venturi having an inlet of maximum area and a throat of minimum area; a throttle valve arranged to regulate the flow through said venturi; a servo-motor for actuating said valve to vary said flow; first and second fluid pressure sensing connections both communicating with said venturi, said first connection being a pitot having an inlet in said venturi inlet arranged to register the total pressure including static pressure plus velocity pressure of the fluid flowing through said venturi, and said second connection being a tap connected to said throat to register the static pressure of said flowing fluid; differential pressure sensitive means having one side subjected to said total pressure through said first connection and its other side subjected to said static pressure through said second connection, whereby to register changes in the differential between said total and static pressures, as a measure of said velocity pressure, so as to register changes in velocity in said flowing fluid; density sensitive means exposed to said total pressure through said first connection and exposed to the temperature in said duct so as to respond to changes in total pressure and temperature in said duct in a manner to register changes in density in said fluid; and means responding to the cumulative deflections of said differential and density sensitive means to obtain a movement which is operative to control said servo-motor, said differential and density sensitive means being arranged to have substantially equal and opposite deflections compensating one another so as to maintain a substantially constant weight flow through a range of density changes in said fluid.

16. Mechanism for controlling fluid flow to a selected weight flow rate, comprising: a flow duct including a venturi having an inlet of maximum area and a throat of minimum area; a throttle valve in said duct; a servo-motor for actuating said valve to vary the flow through said duct; control means comprising a housing defining a pressure chamber, a pair of pressure sensitive elements in said chamber including a differential pressure responsive bellows and a density responsive closed cell, arranged in series in an assembly having at one end said differential bellows mounted to said housing and having its other end free to register changes in the length of said assembly as the cumulative deflections of both said elements; a pair of connections to said venturi, one of which is a pitot communicating with said inlet and with said pressure chamber for registering the total pressure in said duct including static pressure and velocity pressure and for transmitting said total pressure into said chamber, and the other of which is a static pressure registering tap communicating with said throat and with the interior of said differential pressure responsive element, whereby the latter will register the differential between said static and total pressures as the velocity pressure in said duct while said closed cell will register said total pressure in said duct as a factor of density measurement, said closed cell being exposed to the temperature of the fluid in said duct and responding thereto as another factor of density measurement; and means for utilizing movements of said free end of the assembly to control the action of said servo-motor to operate said throttle valve so as to maintain the selected weight flow.

17. Mechanism for controlling fluid flow as defined in claim 16, wherein said differential bellows has, as the means for mounting the same to said housing, a tubular stem projecting from an end thereof and having a threaded connection with said housing providing for bodily adjustment of said assembly along its longitudinal axis for setting the control position of said free end, said stem constituting a portion of said static pressure registering tap connection.

18. Mechanism for controlling fluid flow to a controlled weight flow rate, comprising: means defining a throat through which the fluid flows; means for varying the orifice area of said throat; a throttle valve arranged to regulate the flow through said throat; a servo-motor for actuating said valve to vary said flow; first and second fluid pressure sensing connections both communicating with said throat, said first connection being arranged to register the total pressure including static pressure plus velocity pressure of the fluid flowing through said throat, and said second connection being arranged to register the static pressure of said flowing fluid; differential pressure sensitive means having one side subjected to said total pressure through said first connection and its other side subjected to said static pressure through said second connection, whereby to register changes in the differential between said total and static pressures, as a measure of said velocity pressure, so as to register changes in velocity in said flowing fluid; density sensitive means exposed to said total pressure through said first connection and exposed to the temperature in said duct so as to respond to changes in total pressure and temperature in said duct in a manner to register changes in density in said fluid; and means responding to the cumulative deflections of said differential and density sensitive means to obtain a movement which is operative to control said servo-motor, said differential and density sensitive means being arranged to have substantially equal and opposite deflections compensating one another so as to maintain a weight flow rate which is constant for any orifice area to which said throat has been adjusted.

19. Mechanism for controlling fluid flow to a selected weight flow rate, comprising: a duct having a restricted orifice through which the fluid flows; means for varying the area of said orifice; a throttle valve arranged to regulate the flow through said duct; a servo-motor for actuating said valve to vary said flow; first and second fluid pressure sensing connections both communicating with a region of restricted flow length within said duct adjacent said orifice, said first connection being upstream of said orifice and arranged to register the total pressure including static pressure plus velocity pressure of the fluid flowing through said duct, and said second connection being downstream of said orifice and arranged to register the static pressure of said flowing fluid; differential pressure sensitive means having one side subjected to said total pressure through said first connection and its other side subjected to said static pressure through said second connection, whereby to register changes in the differential between said total and static pressures, as a measure of said velocity pressure, so as to register changes in velocity in said flowing fluid; density sensitive means exposed to said total pressure through said first connection and exposed to the temperature in said duct so as to respond to changes in total pressure and temperature in said duct in a manner to register changes in density in said fluid; and means responding to the cumulative deflections of said differential and density sensitive means to obtain a movement which is operative to control said servomotor, said differential and density sensitive means being arranged to have substantially equal and opposite deflections in response respectively to variations in velocity (as represented by differential pressure changes) and in density, in compensating amounts such that said deflections substantially cancel one another so long as the weight flow rate remains constant, whereby to maintain a weight flow rate which is substantially constant for any area to which said orifice may be adjusted.

20. Apparatus as defined in claim 19, wherein said duct comprises a tube section having a flow passage of substantially constant diameter, wherein said orifice varying means comprises a valve in said passage near the upstream end thereof, and wherein said throttle valve is likewise disposed in said passage, near the downstream end thereof.

21. For controlling to a selected weight flow rate, fluid flow in a flow regulating system comprising a flow duct, a throttle valve therein, a servo-motor for actuating said valve to vary the flow through said duct, a connection to said duct for registering the total pressure including static pressure plus velocity pressure of the fluid flowing in said duct; and a connection in said duct for registering the static pressure of said fluid therein; a controller comprising: differential pressure sensitive means exposed on its respective sides to said total pressure and static pressure so as to register changes in the differential therebetween, as a measure of said velocity pressure, whereby to register changes in velocity in said flowing fluid; density sensitive means responsive to changes in total pressure and temperature in said duct, whereby to register changes in density in said fluid; and means responding to the cumulative deflections of said differential and density sensitive means to obtain a movement which is operative to control said servo-motor, said differential and density sensitive means being arranged to have substantially equal and opposite deflections tending to compensate one another so as to maintain a substantially constant weight flow through a range of density changes in said fluid, the free length of said density sensitive means being so related to that of said differential pressure sensitive means as to be substantially equivalent to the compression of said differential pressure sensitive means under the velocity pressure existing at a base level of operation.

22. For controlling to a selected weight flow rate, fluid flow in a flow regulating system comprising a flow duct, a throttle valve therein, a servo-motor for actuating said valve to vary the flow through said duct, and a pair of connections in said duct, one of which is a pitot for registering the total pressure in said duct including static pressure and velocity pressure, and the other of which is a static pressure registering tap, a controller comprising: a housing defining a pressure chamber, a pair of pressure sensitive elements in said chamber, arranged in series in an assembly one end of which is mounted to said housing and the other end of which is free to register the changes in the length of said assembly as the cumulative deflections of both said elements, one of said elements being a density responsive closed cell and the other being responsive to the differential between the pressures acting externally and internally thereon, one of said connections communicating with said pressure chamber and the other communicating with the interior of said differential pressure responsive element, whereby the latter will register the differential between said static and total pressures as the velocity pressure in said duct while said closed cell will register said total pressure in said duct as a factor of density measurement, said closed cell being exposed to the temperature of the fluid in said duct and responding thereto as another factor of density measurement; and means for utilizing movements of said free end of the assembly to control the action of said servo-motor to operate said throttle valve so as to maintain the selected weight flow, said differential and density sensitive means being arranged to have substantially equal and opposite deflections tending to compensate one another so as to maintain said free end in a static position so long as the weight flow rate of said fluid remains constant.

References Cited in the file of this patent

UNITED STATES PATENTS

| | | |
|---|---|---|
| 1,401,668 | Brown et al. | Dec. 27, 1921 |
| 2,295,728 | Gess | Sept. 15, 1942 |
| 2,385,664 | Warner | Sept. 25, 1945 |
| 2,425,000 | Paget | Aug. 5, 1947 |
| 2,451,835 | Johnson | Oct. 19, 1948 |

FOREIGN PATENTS

| | | |
|---|---|---|
| 559,076 | France | June 7, 1923 |